US012807096B2

(12) United States Patent
Behr et al.

(10) Patent No.: US 12,807,096 B2
(45) Date of Patent: Nov. 24, 2026

(54) METHOD FOR CONTROLLING A CLEANING SYSTEM FOR MOTOR VEHICLE COMPONENTS, CLEANING SYSTEM FOR MOTOR VEHICLE COMPONENTS, AND MOTOR VEHICLE WITH A CLEANING SYSTEM FOR MOTOR VEHICLE COMPONENTS

(71) Applicant: KAUTEX TEXTRON GMBH & CO. KG, Bonn (DE)

(72) Inventors: Christian Behr, Bonn (DE); René Erich Müller, Bonn (DE); Cheng Xi, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 19/125,693

(22) PCT Filed: Oct. 30, 2023

(86) PCT No.: PCT/EP2023/080212
§ 371 (c)(1),
(2) Date: Apr. 29, 2025

(87) PCT Pub. No.: WO2024/094609
PCT Pub. Date: May 10, 2024

(65) Prior Publication Data

US 2026/0008437 A1 Jan. 8, 2026

(30) Foreign Application Priority Data

Oct. 31, 2022 (DE) ..................... 10 2022 128 859.5

(51) Int. Cl.
*B60S 1/48* (2006.01)
*B60S 1/56* (2006.01)
*F04D 15/00* (2006.01)

(52) U.S. Cl.
CPC ................. *B60S 1/481* (2013.01); *B60S 1/56* (2013.01); *F04D 15/0066* (2013.01); *F05D 2270/3013* (2013.01)

(58) Field of Classification Search
CPC ........ B60S 1/481; B60S 1/56; F04D 15/0066; F05D 2270/3013
See application file for complete search history.

(56) References Cited

U.S. PATENT DOCUMENTS 6,308,516 B1 * 10/2001 Kamada ................ F15B 11/167 60/452
2018/0003180 A1 * 1/2018 Raghavachari ......... F04D 13/14
(Continued)

FOREIGN PATENT DOCUMENTS

DE 10 2021 117 474 A1 1/2022
DE 10 2021 120 155 A1 2/2022
(Continued)

OTHER PUBLICATIONS

International Preliminary Report on Patentability (w/ English translation) in corresponding PCT Application No. PCT/EP2023/080212, mailed May 13, 2025, in 14 pgs.

*Primary Examiner* — Angelisa L. Hicks
(74) *Attorney, Agent, or Firm* — Dority & Manning, P.A.

(57) ABSTRACT

A system and method for controlling a cleaning system for motor vehicle components, wherein the cleaning system includes a fluid conveying device, a pressure sensor for determining a pressure generated by the fluid conveying device, a fluid distribution device with at least one input port fluid-connected to the fluid conveying device and with at least two output ports fluid-connected to the input port, wherein each output port is adjustable between an open position and a closed position, at least two cleaning devices, each fluid-connected to a respective output connection via a fluid line and a control device, which is data-coupled to the
(Continued)

Figure 1:
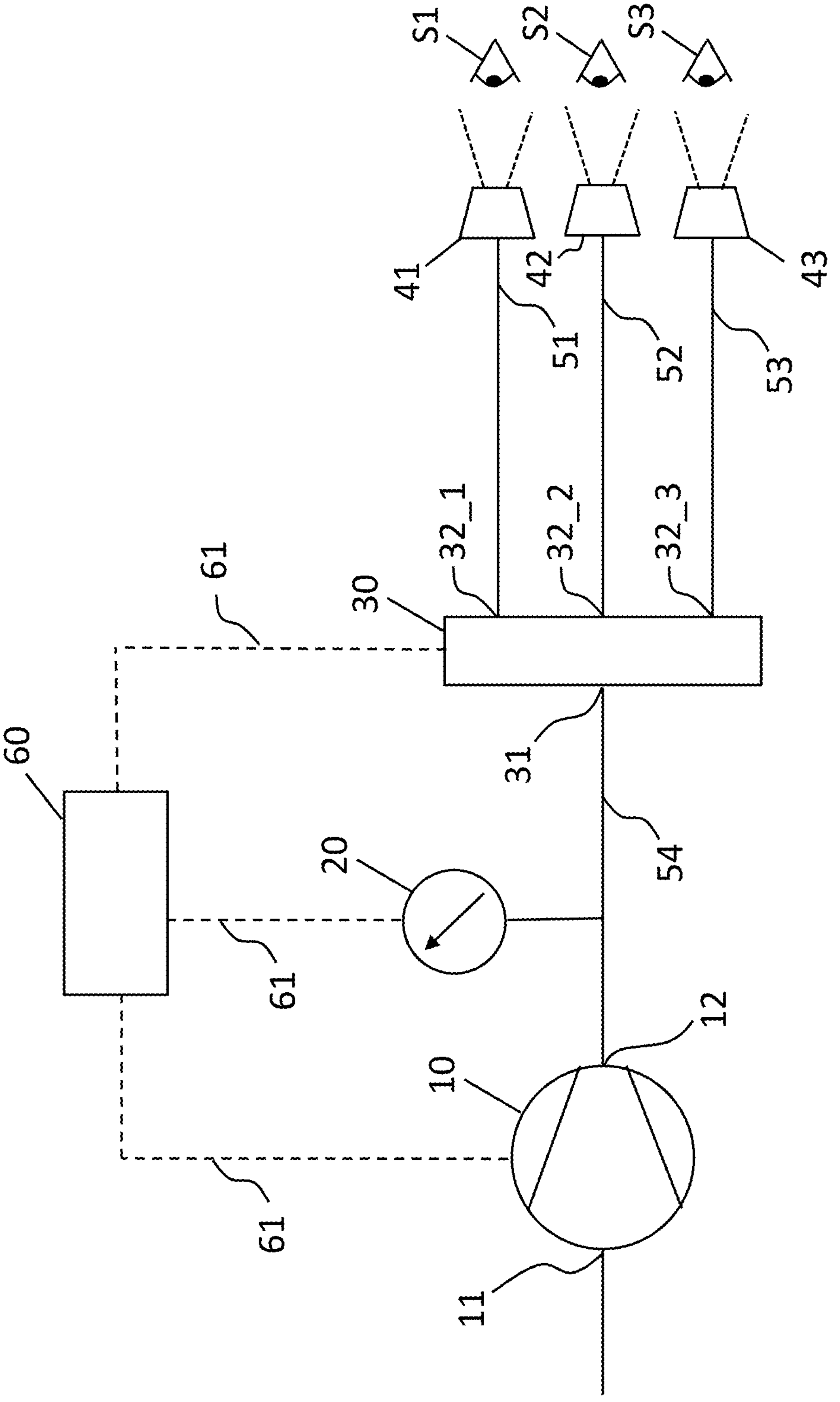

fluid conveying device the pressure sensor and the fluid distribution device for transmitting and/or receiving signals, the method achieving simplified control of the cleaning system and a reduction in the susceptibility of the cleaning system to errors.

7 Claims, 5 Drawing Sheets

(56) References Cited

U.S. PATENT DOCUMENTS

| | | | | |
|---|---|---|---|---|
| 2021/0179030 | A1* | 6/2021 | Sakai | B60S 1/56 |
| 2022/0185240 | A1 | 6/2022 | Giraud et al. | |

FOREIGN PATENT DOCUMENTS

| | | | |
|---|---|---|---|
| FR | 3 094 311 | A1 | 10/2020 |
| FR | 3 097 826 | A1 | 1/2021 |
| FR | 3 119 136 | A1 | 7/2022 |
| FR | 3 121 896 | A1 | 10/2022 |
| WO | WO 2020/193328 | A1 | 10/2020 |

* cited by examiner

METHOD FOR CONTROLLING A CLEANING SYSTEM FOR MOTOR VEHICLE COMPONENTS, CLEANING SYSTEM FOR MOTOR VEHICLE COMPONENTS, AND MOTOR VEHICLE WITH A CLEANING SYSTEM FOR MOTOR VEHICLE COMPONENTS

CROSS-REFERENCE TO RELATED APPLICATIONS

This application is the U.S. National Stage entry of International Application No. PCT/EP2023/080212, filed on Oct. 30, 2023, which, in turn, claims priority to DE Patent Application No. 10 2022 128 859.5, filed on Oct. 31, 2022, both of which are hereby incorporated herein by reference in their entireties for all purposes.

The present invention relates to a method for controlling a cleaning system for motor vehicle components. Furthermore, the present invention relates to a cleaning system for motor vehicle components for carrying out the method. Furthermore, the present invention relates to a motor vehicle with a component cleaning system.

Motor vehicles, and in particular motor vehicles designed for autonomous or semi-autonomous driving, usually have a large number of sensors that can be used to monitor the environment and/or a driving situation of the motor vehicle. These vehicle components designed as vehicle sensors can, for example, have optical sensors, cameras, radar sensors or lidar sensors.

To ensure the functionality and operational readiness of motor vehicle components and, in particular, motor vehicle sensors, these must be cleaned regularly. Depending on the motor vehicle component or the type of sensor and the degree of soiling, a cleaning device (cleaning nozzle) of a cleaning system must apply a cleaning fluid at a predetermined fluid pressure to the relevant component and/or the relevant sensor for a predetermined time in accordance with a cleaning request.

Up to now, cleaning systems have been envisaged that have a large number of pressure sensors or flow sensors, each of which is usually assigned to a cleaning nozzle. This plurality of pressure sensors or flow sensors are arranged in the cleaning system and designed to determine the fluid pressures or the flow rate of the cleaning fluid that is discharged from the respective cleaning nozzles. This fluid pressure information is used to control a central fluid conveying device (pump) in such a way that a cleaning request is met.

The cleaning systems known from the state of the art therefore have a large number of components and, in particular, a large number of pressure sensors and/or flow sensors. As a result, these cleaning systems are error-prone and cost-intensive. The processes for controlling the corresponding cleaning systems are correspondingly complex.

The present invention is based on the task of providing a method for controlling a cleaning system for motor vehicle components, which enables simplified control of the cleaning system and also enables the cleaning system to be less error-prone and less cost-intensive.

The problem underlying the present invention is solved according to a first aspect by a method having the features of claim 1. Embodiments of the method are described in the claims dependent on claim 1.

More specifically, the problem underlying the present invention is solved by a method for controlling a cleaning system for motor vehicle components, the cleaning system having a fluid conveying device, a pressure sensor for determining a pressure generated by the fluid conveying device and a fluid distribution device with at least one input connection fluid-connected to the fluid conveying device and with at least two output connections fluid-connected to the input connection, wherein each output connection is adjustable between an open position and a closed position, at least two cleaning devices each fluid-connected via a fluid line to a respective output connection, and a control device which is data-coupled to the fluid conveying device and the fluid distribution device for transmitting and/or receiving signals. The method according to the invention has the following method steps:

- determining a cleaning request for at least two cleaning devices;
- determining a first target flow rate for at least one first cleaning device;
- setting the output connections of the fluid distribution device in their open position or in their closed position according to the cleaning request;
- determining a power level of the fluid conveying device;
- Determining an actual fluid pressure generated by the fluid conveying device;
- determining an actual total flow rate delivered by the fluid conveying device based on the determined actual fluid pressure and the determined power level;
- determining a first actual flow rate by the output connection to which the at least one first cleaning device is connected or by the at least one first cleaning device based on the actual total flow rate and based on the cleaning request;
- determining a flow rate control value based on the first target flow rate and the first actual flow rate; and
- adjusting the fluid conveying device in such a way that the actual total flow rate provided by the fluid conveying device is changed by the flow rate control value so that the first actual flow rate approaches the first target flow rate.

The method according to the invention has the advantage that a cleaning system for motor vehicle components can be considerably simplified. In particular, the cleaning system can enable a considerably reduced number of monitoring devices for monitoring cleaning pressures and/or cleaning quantities, which must be provided by the individual cleaning devices of the cleaning system in order to ensure a required cleaning result. This is because the method makes it possible to centrally determine an actual total flow rate at one point in the cleaning system, whereby the cleaning quantities or the flow rate are calculated at the respective cleaning devices. Furthermore, the method according to the invention has the advantage that no flow sensor is required to determine the actual total flow rate, which makes the cleaning system considerably more stable and therefore less maintenance-intensive. This is because flow sensors have considerably more moving parts than pressure sensors, which are subject to wear over time.

The inventors have discovered that, surprisingly, the power level of the fluid conveying device alone is not sufficient to determine the actual total flow rate. This is because the hydraulic load in the cleaning system is not constant. The inventors have discovered that, surprisingly, the actual total flow rate can be inferred by determining the actual fluid pressure generated by the fluid conveying device together with the power level of the fluid conveying device.

The vehicle components can, for example, be designed as vehicle sensors or have vehicle sensors, which in turn can have optical sensors, for example. For example, the vehicle sensors can have at least one camera and/or at least one lidar sensor. Furthermore, the vehicle sensors can have a radar sensor. The motor vehicle components can also be designed as, for example, wind-screens, rear windows, headlights, rear lights, warning lights and/or other lighting devices or have these.

The fluid conveying device can also be referred to as a fluid pump or simply as a pump. The fluid conveying device has at least one fluid inlet connection via which the fluid conveying device is supplied with a cleaning fluid. For example, the fluid conveying device is fluid-connected to a cleaning container by means of the fluid inlet connection, whereby a cleaning fluid can be filled into the cleaning container. The fluid conveying device also has at least one fluid output connection via which the cleaning fluid can be output under pressure.

The fluid conveying device can also have two or more than two fluid output connections, each of which is preferably adjustable between an open position and a closed position.

The fluid distribution device is used to distribute the cleaning fluid provided by the fluid conveying device for the cleaning devices of the cleaning system. The fluid distribution device can also be referred to as a valve block.

In the open position of an output connection of the fluid distribution device, fluid delivery from the input connection of the fluid distribution device through the respective output connection is enabled, whereas in the closed position of an output connection, fluid delivery from the input connection through the respective output connection is prevented. Preferably, the respective output connections can be adjusted discretely between their open position and their closed position, i.e. in the open position of an output connection, it is completely open, whereas in the closed position of an output connection, it is completely closed.

The fluid distribution device preferably has more than two output connections. For example, the fluid distribution device has three, four, five, six or more output connections. According to the invention, there are no restrictions with regard to the number of output connections.

The cleaning devices are preferably designed as cleaning nozzles. Preferably, the cleaning system has a number of cleaning devices corresponding to the number of output connections. For example, one cleaning device is connected to each output connection. However, it is also possible that more than one cleaning device is connected to an output connection. For example, two or more cleaning devices can also be connected to an output connection. Furthermore, for example, two first cleaning devices can be connected to an output connection, so that the two first cleaning devices are fluid-connected to the output connection.

Each cleaning device can be fluid-connected to an output connection of the fluid distribution device via a respective line, which can also be referred to as a fluid line. For example, a first cleaning device can be fluid-connected to a first output connection by means of a first line, a second cleaning device can be fluid-connected to a second output connection by means of a second line and so on.

It is also possible for more than one cleaning device to be fluid-connected to an output connection.

The cleaning fluid or the fluid is preferably a liquid, for example water and/or a cleaning solution. Consequently, the fluid conveying device can also be referred to as a liquid conveying device or a liquid pump.

The control device is preferably also data-coupled with the pressure sensor for transmitting and/or receiving signals.

Preferably, the fluid conveying device is data-coupled with the pressure sensor for transmitting and/or receiving signals.

In the method step of determining the cleaning request for at least two cleaning devices, request information is determined which contains information on which output connections are to be opened. This means that the request information contains information about which of the vehicle components are to be cleaned.

Furthermore, the cleaning request contains information about the fluid flow rate or target flow rate to be dispensed from the respective cleaning devices and optionally the duration of how long cleaning fluid is to be dispensed from the respective cleaning devices. For example, the cleaning request is determined by receiving it.

Preferably, the method is designed such that when determining a cleaning request for at least two cleaning devices, a cleaning request is determined for all cleaning devices.

For example, the cleaning request may contain information that a first vehicle sensor is to be supplied with cleaning fluid at a first target flow rate of 90 ml/s for a duration of one second, a second vehicle sensor is to be supplied with no cleaning fluid and a third vehicle sensor is to be supplied with cleaning fluid at a third target flow rate of 75 ml/s for a duration of two seconds.

The flow rate through the cleaning nozzle automatically deter-mines the pressure at the cleaning nozzle.

In the process step of determining a first target flow rate for at least one first cleaning device, this first target flow rate is achieved in the course of the iterative execution of the process. The first target flow rate can be determined by reading out the cleaning request.

In the process step of setting the output connections of the fluid distribution device in their open position or in their closed position, the output connections are preferably transferred discretely into their open position or into their closed position. This means that there are preferably no intermediate positions of the respective output connections. If, for example, a cleaning request is determined according to which a first vehicle sensor and a third vehicle sensor, but not a second vehicle sensor, are to be cleaned, the first and third output connections are transferred to their respective open positions and the second output connection is transferred to its closed position.

The three process steps described above are preferably carried out once for each cleaning job or until a cleaning job is completed. However, it is also possible for these three process steps described above to be carried out several times per cleaning job. The process steps described below are preferably carried out as often as necessary until a difference between the first target flow rate and the first actual flow rate falls below a predetermined limit value.

The actual total flow rate is preferably determined by means of pressure information data provided by the pressure sensor and by means of data representing the power level of the fluid conveying device. The data representing the power level of the fluid conveying device can, for example, include the rotational speed of a pump.

The determination of the first actual flow rate by the first cleaning device depends on the actual total flow rate provided by the fluid conveying device, which is divided between the cleaning devices associated with an output connection, of the fluid distribution device that is in the open position. Therefore, it is possible to determine the first actual flow rate through the first cleaning device based on the actual total flow rate.

In the process step of determining the first actual flow rate by the first cleaning device, at least one further flow rate can also be determined by at least one further cleaning device based on the actual total flow rate.

In the method, a first pressure loss in a line section via which the first cleaning device is fluid-connected to the fluid conveying device can be determined, taking into account the first actual flow rate. The determination of the first pressure loss is dependent on the first actual flow rate through the first cleaning device. The line section, via which the first cleaning device is fluid-connected to the fluid conveying device, more specifically to the fluid output connection of the fluid conveying device, has, for example, a collecting fluid line from the fluid output connection to the fluid distribution device, the fluid distribution device, a first fluid line, via which a first output connection of the fluid distribution device is fluid-connected to the first cleaning device, and the first fluid distribution device. The first pressure loss is preferably determined by means of a calculation.

In the process step for determining or calculating the flow rate control value, the flow rate value is determined that the fluid conveying device should generate so that cleaning fluid can be dispensed from the first cleaning device at the first target flow rate. The flow rate control value is calculated, for example, from the difference between the first target flow rate and the first actual flow rate.

In the method step of adjusting the fluid conveying device in such a way that an actual total flow rate provided by the fluid conveying device is changed by the flow rate control value so that the first actual flow rate approaches the first target flow rate, a power level of the fluid conveying device is adjusted accordingly. The power level of the fluid conveying device can, for example, be a rotational speed of the fluid conveying device.

The power level of the fluid conveying device can, for example, be a rotational speed of the fluid conveying device. In certain fluid conveying devices, a rotational speed of the fluid conveying device is proportional to the fluid flow rate that can be conveyed by means of the fluid conveying device.

Preferably, the method is designed in such a way that the method step of determining the first actual flow rate by the first cleaning device is also carried out based on switching positions of the output connections of the fluid distribution device.

The advantage of the correspondingly designed method is that the first actual flow rate is determined with increased accuracy by the first cleaning device. This significantly improves the control accuracy of the corresponding method.

The cleaning fluid conveyed by the fluid conveying device is divided between the line sections in which the output connections of the fluid distribution device assigned to these line sections are located in their respective open positions. The actual total flow rate is divided according to the flow resistances of the line sections located downstream of the output connections. If, for example, a flow resistance of a line section assigned to the first cleaning device is smaller than a flow resistance of a line section assigned to the third cleaning device, then a cleaning fluid flow through the line section assigned to the first cleaning device will be greater than a flow rate of the cleaning fluid flow through the line section assigned to the third cleaning device.

Preferably, the method is designed such that the method step of determining the first actual flow rate is also carried out based on a first conversion table which indicates the ratios of the flow rates through the line paths assigned to the respective cleaning devices as a function of actual total flow rates provided by the fluid conveying device.

The correspondingly designed method has the advantage that the flow rate is determined by the first cleaning device with a reduced computational effort. This is because the first conversion table, which can also be referred to as the first look-up table, is preferably stored in the control device or in another electronic memory, so that the ratios of the flow rates do not always have to be recalculated for each iteration step of the method.

In the first conversion table, the ratios of the flow rates through the line paths assigned to the respective cleaning devices are specified for a large number of actual total flow rates provided by the fluid conveying device. These ratios of the flow rates through the line paths assigned to the respective cleaning devices are preferably standardized to a line path that has the lowest flow rate at a specified actual total flow rate among all line paths. This line path is preferably normalized to 1, so that the flow rates through the other line paths are correspondingly greater than 1 in each case.

The following is an example of a corresponding first conversion table

| Actual total flow rate | Flow through first cleaning device | Flow through second cleaning device | Flow through third cleaning device |
|---|---|---|---|
| 30 ml/s | 2.54 | 1.68 | 1 (reference) |
| 60 ml/s | 2.7 | 1.75 | 1 (reference) |
| 120 ml/s | 2.8 | 1.85 | 1 (reference) |
| 180 ml/s | 2.9 | 1.9 | 1 (reference) |

According to this exemplary first conversion table, at an actual total flow rate of 120 ml/s generated by the fluid conveying device, 2.8 times as much cleaning fluid flows through the first cleaning device as through the third cleaning device. 1.85 times as much cleaning fluid flows through the second cleaning device as through the third cleaning device.

Preferably, the method is designed such that the method step of determining the first actual flow rate is carried out based on at least one second conversion table, wherein in a second conversion table the percentage flow rates through the line paths assigned to the respective cleaning devices are specified for all permutations of switching positions of all output connections of the fluid distribution device for an actual total flow rate provided by the fluid conveying device.

The correspondingly designed method has the advantage that the flow rate is determined by the first cleaning device with a reduced computational effort. This is because the second conversion table, which can also be referred to as the second look-up table, is preferably stored in the control device or in another electronic memory, so that the ratios of the flow rates do not always have to be recalculated for each iteration step of the method.

Preferably, a second conversion table is available for each of a plurality of actual total flow rates provided by the fluid conveying device and stored in the control device or in another electronic memory.

For each permutation of the switching positions of all output connections of the fluid distribution device, the sum of the percentage flow rates through the line paths assigned to the respective cleaning devices is always 100% of the actual total flow rate delivered by the fluid conveying device.

Both the first conversion table and all second conversion tables can be determined using a computer simulation if the cleaning system is digitized. It is also possible for the first conversion table and all second conversion tables to be determined using preliminary measurements on the actual cleaning system.

An example of a corresponding second conversion table for an actual total flow rate of 90 ml/s is given below:

| First output connection | Second output connection | third output connection |
|---|---|---|
| 0 | 0 | 100 |
| 0 | 100 | 0 |
| 0 | 66 | 33 |
| 100 | 0 | 0 |
| 80 | 0 | 20 |
| 66 | 33 | 0 |
| 57.1 | 28.6 | 14.3 |

According to this exemplary second conversion table, for example, at an actual total flow rate of 90 ml/s generated by the fluid conveying device with the first and second output connections in the closed position and the third output connection open, 100% of the total fluid flow flows through the third output connection (first line of the second conversion table corresponding to a first switching permutation).

According to the third line (corresponding to a third switching permutation) of the second conversion table above, 66% of the total fluid flow flows through the second output connection and 33% through the third output connection when the first output connection is in the closed position and the second and third output connections are in the open position.

According to the seventh line (corresponding to a seventh switching permutation) of the second conversion table above, all output connections are in the open position and 57.1% of the total fluid flow flows through the first output connection, 28.6% of the total fluid flow flows through the second output connection and 14.3% flows through the third output connection. Preferably, the method is designed such that during the method step of determining at least one first target flow rate for at least one first cleaning device, at least one further target flow rate is additionally determined for at least one second cleaning device and a value calculated on the basis of these determined target flow rates is adopted as the target flow rate.

The correspondingly designed method has the advantage that, in the case of a cleaning request for more than one motor vehicle component, at least two of the motor vehicle components are acted upon by the cleaning fluid at fluid flow rates that at least approximately correspond to the respective target flow rates, so that a cleaning result for a plurality of motor vehicle components is improved.

For example, the value based on the determined target flow rates, which is adopted as the target flow rate, is calculated by calculating the mean value of the determined target flow rates.

The problem underlying the present invention is further solved according to a second aspect by a method having the features of claim 5. Embodiments of the method are described in the claims dependent on claim 5.

More specifically, the problem underlying the present invention is solved by a method for controlling a cleaning system for motor vehicle components, the cleaning system having a fluid conveying device, a pressure sensor for determining a pressure generated by the fluid conveying device and a fluid distribution device with at least one input connection fluid-connected to the fluid conveying device and with at least two output connections fluid-connected to the input connection, wherein each output connection is adjustable between an open position and a closed position, at least two cleaning devices each fluid-connected via a fluid line to a respective output connection, and a control device which is data-coupled to the fluid conveying device and the fluid distribution device for transmitting and/or receiving signals. The method according to the invention has the following method steps:

- Determining a cleaning request for at least two, preferably for all cleaning devices;
- Determination of respective target flow rates for each cleaning device;
- Setting the output connections of the fluid distribution device in their open position or in their closed position according to the cleaning request;
- Determining a power level of the fluid conveying device;
- Determining an actual fluid pressure generated by the fluid conveying device;
- Determining an actual total flow rate delivered by the fluid conveying device based on the determined actual fluid pressure and the determined power level;
- Determine a target total flow rate through the cleaning devices based on the cleaning request;
- Determine a flow rate control value based on the target total flow rate and the actual total flow rate; and
- Adjusting the fluid conveying device in such a way that the actual total flow rate provided by the fluid conveying device is changed by the flow rate control value so that the actual total flow rate approaches the target total flow rate.

The method according to the invention has the advantage that a cleaning system for motor vehicle components can be considerably simplified. In particular, the cleaning system can enable a considerably reduced number of monitoring devices for monitoring cleaning pressures and/or cleaning quantities, which must be provided by the individual cleaning devices of the cleaning system in order to ensure a required cleaning result. This is because the method makes it possible to centrally determine an actual total flow rate at one point in the cleaning system. Furthermore, the method according to the invention has the advantage that no flow sensor is required to determine the actual total flow rate, which makes the cleaning system considerably more stable and therefore less maintenance-intensive. This is because flow sensors have considerably more moving parts than pressure sensors, which are subject to wear over time.

The inventors have discovered that, surprisingly, the power level of the fluid conveying device alone is not sufficient to determine the actual total flow rate. This is because the hydraulic load in the cleaning system is not constant. The inventors have discovered that, surprisingly, the actual total flow rate can be inferred by determining the actual fluid pressure generated by the fluid conveying device together with the power level of the fluid conveying device.

It should be expressly noted that the subject matter of the second aspect can be advantageously combined with the subject matter of the first aspect of the invention, both individually or cumulatively in any combination. Consequently, reference is made to the above explanations.

In the process step of determining the cleaning request for all cleaning devices, request information is determined which contains information on which output connections are to be opened. This means that the request information contains information about which of the vehicle components are to be cleaned. Furthermore, the cleaning request contains information about the fluid flow rate or target flow rate to be dispensed from the respective cleaning devices and optionally the duration of how long cleaning fluid is to be dispensed from the respective cleaning devices. For example, the cleaning request is determined by receiving it.

In the process step of determining a target total flow rate, this target total flow rate is achieved during the iterative execution of the process. The target total flow rate can be determined by reading out the cleaning request.

In the process step of adjusting the fluid conveying device in such a way that an actual total flow rate provided by the fluid conveying device is changed by the flow rate control value so that the actual total flow rate approaches the target total flow rate, a power level of the fluid conveying device is adjusted accordingly. The power level of the fluid conveying device can, for example, be a rotational speed of the fluid conveying device. Preferably, the method is designed such that the method step of determining an actual total flow rate, which is delivered by the fluid conveying device, is carried out using a characteristic diagram of the fluid conveying device, which indicates the actual total flow rate achievable by the fluid conveying device as a function of the fluid pressure for different power levels of the fluid conveying device.

The advantage of the correspondingly designed method is that the actual total flow rate conveyed by the fluid conveying device can be determined with improved accuracy and more quickly.

The present invention is also based on the task of providing a cleaning system which is less error-prone and less cost-intensive.

This task underlying the present invention is solved by a cleaning system with the features of claim 6.

In more detail, this task underlying the present problem is solved by a cleaning system which has a fluid conveying device, a pressure sensor for determining a pressure generated by the fluid conveying device and a fluid distribution device with at least one input connection fluid-connected to the fluid conveying device and with at least two output connections fluid-connected to the input connection, wherein each output connection is adjustable between an open position and a closed position, at least two cleaning devices each fluid-connected via a fluid line to a respective output connection, and a control device which is data-coupled to the fluid conveying device and the fluid distribution device for transmitting and/or receiving signals. The cleaning system according to the invention is characterized in that the control device is designed to carry out one of the methods described above.

The cleaning system according to the invention has the advantage that it has a reduced number of components and is thus simplified. More precisely, the cleaning system according to the invention has a considerably reduced number of monitoring devices for monitoring cleaning quantities that must be provided by the individual cleaning devices of the cleaning system in order to ensure a required cleaning result. Thus, the cleaning system according to the invention is less error-prone and less cost-intensive.

The vehicle components can, for example, be designed as vehicle sensors or have vehicle sensors, which in turn can have optical sensors, for example. For example, the vehicle sensors can have at least one camera and/or at least one lidar sensor. Furthermore, the vehicle sensors can have a radar sensor. The motor vehicle components can also be designed as, for example, wind-screens, rear windows, headlights, rear lights, warning lights and/or other lighting devices or have these.

The fluid conveying device can also be referred to as a fluid pump or simply as a pump. The fluid conveying device has at least one fluid input connection via which the fluid conveying device is supplied with a cleaning fluid. For example, the fluid conveying device is fluid-connected to a cleaning container by means of the fluid input connection, whereby a cleaning fluid can be filled into the cleaning container. The fluid conveying device also has at least one fluid output connection via which the cleaning fluid can be output under pressure.

The fluid conveying device can also have two or more than two fluid output connections, each of which is preferably adjustable between an open position and a closed position.

The fluid distribution device is used to distribute the cleaning fluid provided by the fluid conveying device for the cleaning devices of the cleaning system. The fluid distribution device can also be referred to as a valve block.

In the open position of an output connection of the fluid distribution device, fluid delivery from the input connection of the fluid distribution device through the respective output connection is enabled, whereas in the closed position of an output connection, fluid delivery from the input connection through the respective output connection is prevented. Preferably, the respective output connections can be adjusted discretely between their open position and their closed position, i.e. in the open position of an output connection, it is completely open, whereas in the closed position of an output connection, it is completely closed.

The fluid distribution device preferably has more than two output connections. For example, the fluid distribution device has three, four, five, six or more output connections. According to the invention, there are no restrictions with regard to the number of output connections.

The cleaning devices are preferably designed as cleaning nozzles. Preferably, the cleaning system has a number of cleaning devices corresponding to the number of output connections. In the case of a motor vehicle component designed as a windshield, for example, several cleaning devices are fluid-connected to an output connection. It is also generally possible for more than one cleaning device to be fluid-connected to an output connection.

Each cleaning device can be fluid-connected to an output connection of the fluid distribution device via a respective line, which can also be referred to as a fluid line. For example, a first cleaning device can be fluid-connected to a first output connection by means of a first line, a second cleaning device can be fluid-connected to a second output connection by means of a second line and so on.

The cleaning fluid or the fluid is preferably a liquid, for example water and/or a cleaning solution. Consequently, the fluid conveying device can also be referred to as a liquid conveying device or a liquid pump.

The control device is preferably also data-coupled with the pressure sensor for transmitting and/or receiving signals.

Preferably, the fluid conveying device is data-coupled with the pressure sensor for transmitting and/or receiving signals.

Preferably, the control device is designed as part of the fluid conveying device and/or integrated into it.

The present invention is also based on the task of providing a motor vehicle which enables improved cleaning of motor vehicle components while at the same time reducing the number of components.

This task underlying the present invention is solved by a motor vehicle with the features of claim 7.

Figure 2:
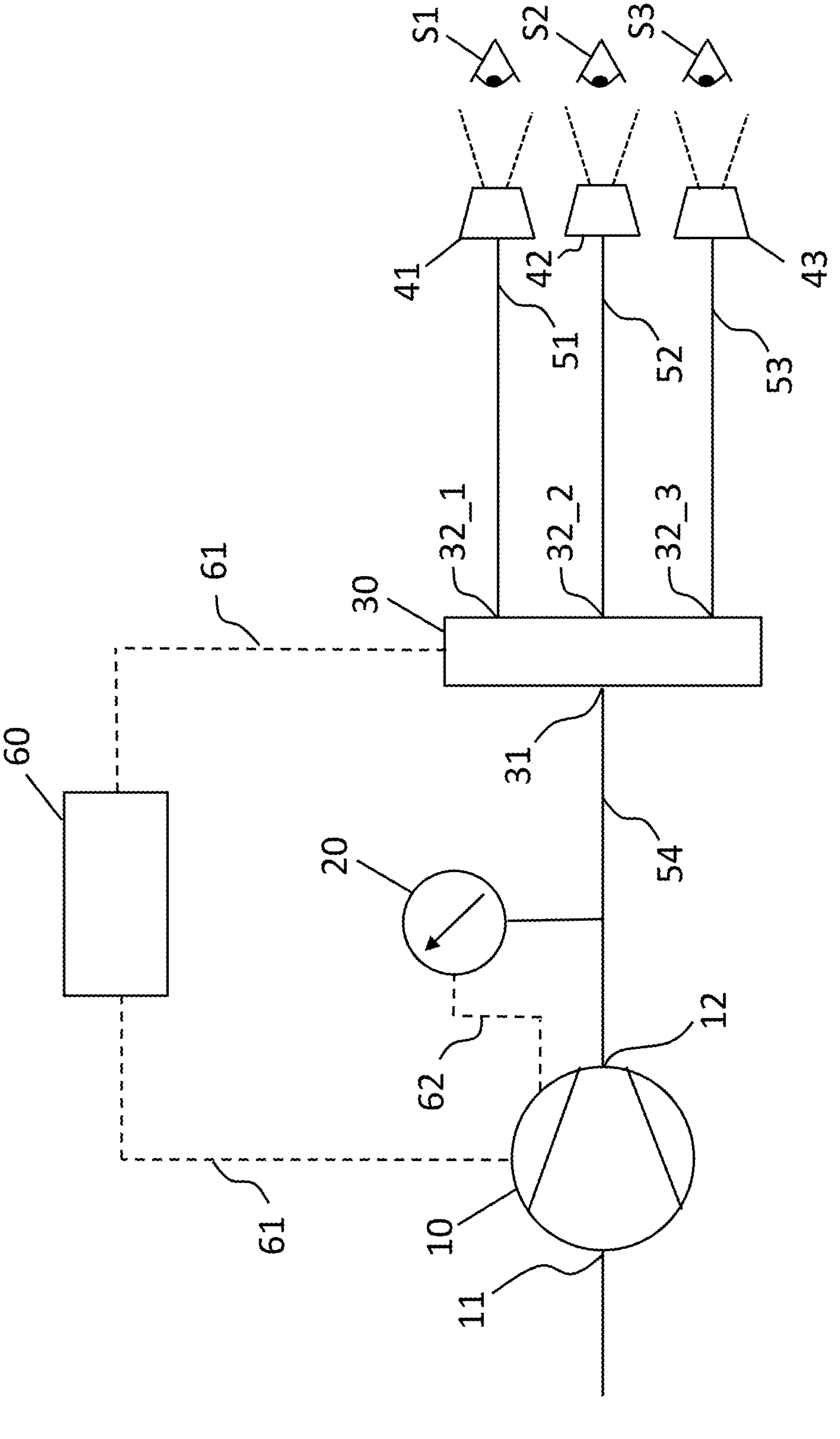
Figure 3:
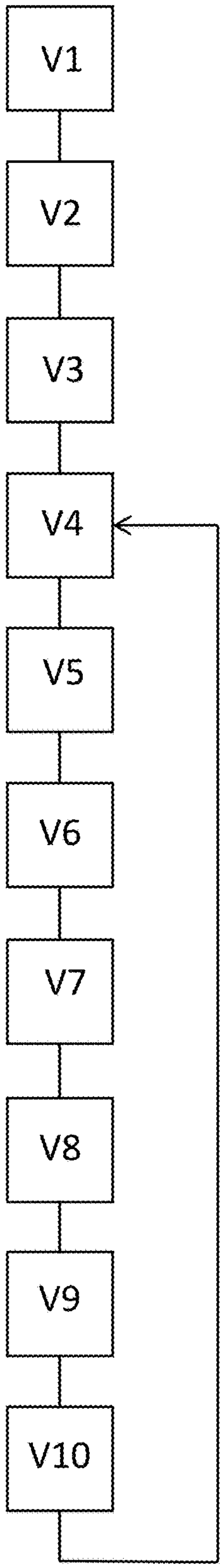
Figure 4:
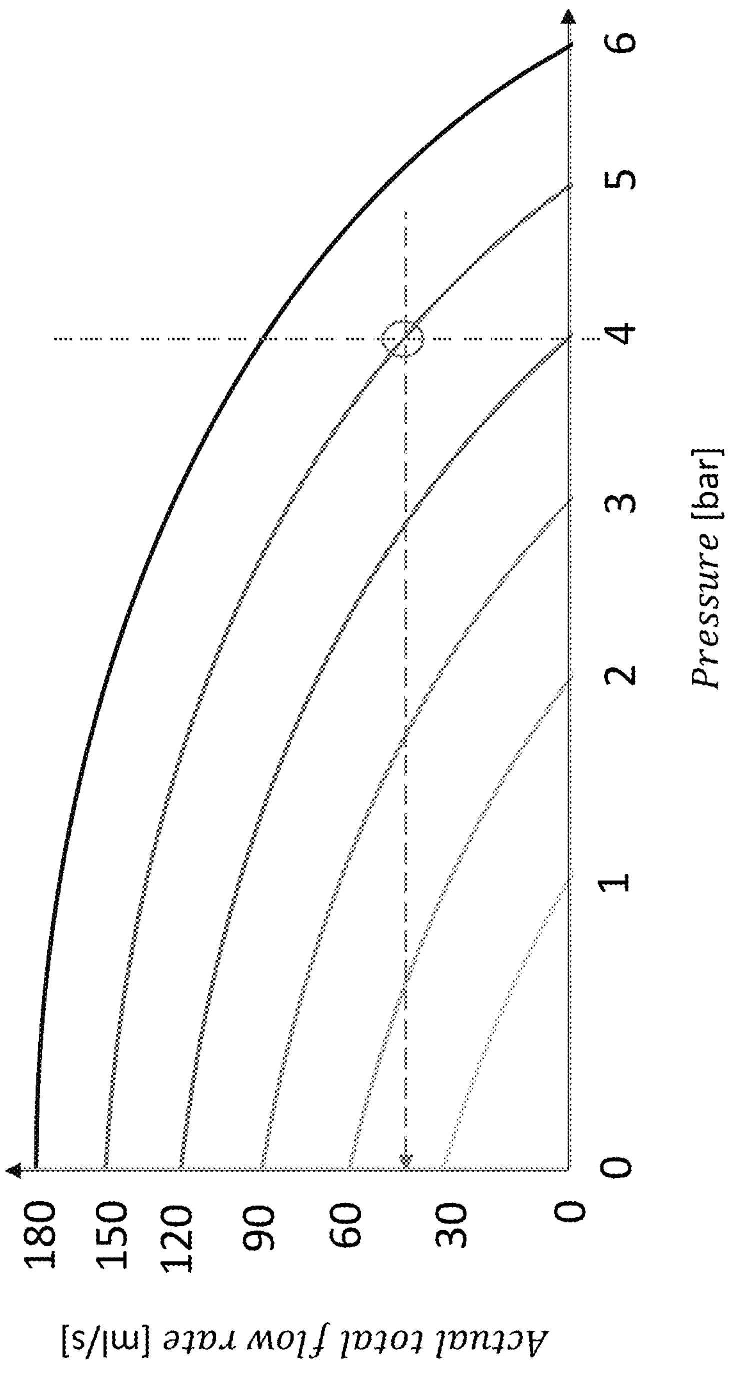
Figure 5:
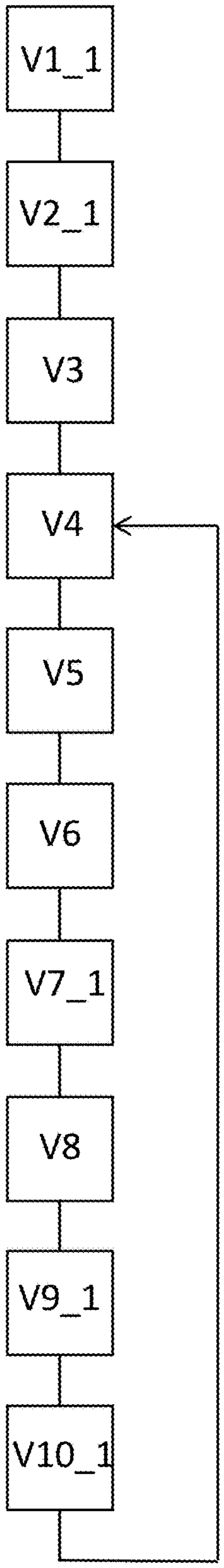

Further advantages, details and features of the invention are shown in the following embodiments. These show in detail:

FIG. 1: a schematic representation of the cleaning system according to the invention;

FIG. 2: a schematic representation of a cleaning system according to a further embodiment of the present invention;

FIG. 3: a flow diagram of a method according to the invention for controlling the cleaning systems shown in FIGS. 1 and 2;

FIG. 4: a characteristic diagram of the fluid conveying device, which indicates the total flow rate achievable by the fluid conveying device as a function of the fluid pressure for different power levels of a fluid conveying device; and FIG. 5: a flow diagram of a method for controlling cleaning systems shown in FIGS. 1 and 2 according to a further embodiment of the present invention.

In the following description, the same reference signs denote the same components or the same features, so that a description carried out in relation to one figure with regard to a component also applies to the other figures, so that a repetitive description is avoided. Furthermore, individual features described in connection with one embodiment can also be used separately in other embodiments.

FIG. 1 shows a schematic representation of a cleaning system according to the invention for motor vehicle components S1, S2, S3, which are designed as motor vehicle sensors S1, S2, S3 in the embodiments described below. However, the present invention is not limited to the fact that the motor vehicle components are designed as motor vehicle sensors or have them. The motor vehicle components may also be formed as or comprise windshields, rear windows, headlights, taillights, warning lights and/or lighting devices in general. The motor vehicle sensors S1, S2, S3 may, for example, have optical sensors. For example, the motor vehicle sensors S1, S2, S3 may have at least one camera and/or at least one lidar sensor. Furthermore, the vehicle sensors S1, S2, S3 can have a radar sensor. In the illustrated embodiment example, the cleaning system has 3 motor vehicle sensors S1, S2, S3, but the present invention is not limited to this number of motor vehicle sensors. The cleaning system according to the invention can have two or more (for example four, five, six or more) vehicle sensors.

The cleaning system has a fluid conveying device 10, which can also be referred to as a fluid pump 10 or simply a pump 10. The fluid conveying device 10 has at least one fluid input connection 11, via which the fluid conveying device 10 is supplied with a cleaning fluid. For example, the fluid conveying device 10 is fluid-connected by means of the fluid input connection 11 to a cleaning container not shown in the figures, whereby a cleaning fluid can be filled into the cleaning container. The fluid conveying device 10 also has at least one fluid output connection 12, via which the cleaning fluid can be output under pressure.

The cleaning system further comprises a fluid distribution device 30 with at least one input connection 31 fluid-connected to the fluid conveying device 10, wherein the input connection 31 of the fluid distribution device 30 is fluid-connected to the fluid output connection 12 of the fluid conveying device 10 by means of a collecting fluid line 54. The fluid distribution device 30 further comprises at least two output connections 32_1, 32_2, 32_3 fluid-connected to the input connection 31. In the illustrated embodiment example, the fluid distribution device 30, which may also be referred to as a valve block 30, has three output connections 32_1, 32_2, 32_3. However, the fluid distribution device 30 may also have more than three output connections. Each of the output connections 32_1, 32_2, 32_3 is adjustable between an open position and a closed position. In the open position of an output connection 32_1, 32_2, 32_3, fluid delivery from the input connection 31 of the fluid distribution device 30 through the relevant output connection 32_1, 32_2, 32_3 is enabled, whereas in the closed position of an output connection 32_1, 32_2, 32_3, fluid delivery from the input connection 31 through the relevant output connection 32_1, 32_2, 32_3 is prevented.

The cleaning system also has a pressure sensor 20 for determining a pressure generated by the fluid conveying device 10

Furthermore, the cleaning system has at least two cleaning devices 41, 42, 43, each fluid-connected via a fluid line 51, 52, 53 to a respective output connection 32_1, 32_2, 32_3. In the embodiment example shown, the cleaning system has three cleaning devices 41, 42, 43, but the cleaning system can also have more than three (for example four, five, six or more) cleaning devices 41, 42, 43. In the embodiment example shown, the cleaning devices 41, 42, 43 are designed as cleaning nozzles 41, 42, 42. The cleaning devices 41, 42, 43 are designed to dispense or spray the cleaning fluid conveyed by the fluid conveying device 10 onto the vehicle sensors S1, S2, S3. In the illustrated embodiment example, one cleaning device 41, 42, 43 is assigned to each vehicle sensor S1, S2, S3.

Furthermore, the cleaning system has a control device 60, each of which is data-coupled via a data line 61 or signal line 61 to the fluid conveying device 10, the pressure sensor 20 and the fluid distribution device 30 for transmitting and/or receiving signals. The control device 60 is designed to receive data determined by the pressure sensor 20. Furthermore, the control device 60 is designed to receive data transmitted by the fluid conveying device 10, which represents the power level of the fluid conveying device 10. Furthermore, the control device 60 is designed to transmit control signals to the fluid conveying device 10 for setting the power level of the fluid conveying device 10. Furthermore, the control device 60 is designed to receive data transmitted by the fluid distribution device 30, which represent the switching positions of the output connections 32_1, 32_2, 32_3. Furthermore, the control device 60 is designed to transmit control signals to the fluid distribution device 30 for adjusting the switching positions of the output connections 32_1, 32_2, 32_3.

The control device 60 is designed to carry out the process steps shown in FIG. 3 or the process steps shown in FIG. 5 and described below.

FIG. 2 shows a schematic representation of a cleaning system according to a further embodiment of the present invention. The cleaning system shown in FIG. 2 essentially corresponds to the cleaning system shown in FIG. 1, with the exception that the control device 60 is only data-coupled to the fluid conveying device 10 and to the fluid distribution device 30 via data lines 61 for transmitting and/or receiving signals, but not to the pressure sensor 20. On the other hand, in the cleaning system shown in FIG. 2, the fluid conveying device 10 is data-coupled to the pressure sensor 20 by means of a data line or signal line 62 for transmitting and/or receiving signals. The fluid conveying device 10 is designed to receive data determined by the pressure sensor 20.

The remaining structure of the cleaning system shown in FIG. 2 corresponds to that of the cleaning system shown in FIG. 1, so that reference is made to the above description in order to avoid repetition.

The control device 60 and/or the fluid conveying device 10 are designed to carry out the process steps shown in FIG. 3 or the process steps shown in FIG. 5 and described below.

As indicated above, FIG. 3 shows the flow diagram of a method for controlling the cleaning system shown in FIG. 1 or the cleaning system shown in FIG. 2.

In a method step V1, a cleaning request is determined for at least two cleaning devices 41, 42, 43. The cleaning request contains information about which vehicle sensor S1, S2, S3 is to be cleaned. Consequently, the cleaning request contains information on which cleaning device 41, 42, 42 is to be activated. Furthermore, the cleaning request contains information about how high the fluid flow rate at the outlets of the cleaning devices 41, 42, 43 should be. Furthermore, the cleaning request can contain information on the duration for which the cleaning devices should dispense cleaning fluid.

In a method step V2, at least a first target flow rate is determined for at least one first cleaning device 41, 42, 43. It is also possible that at least one further target flow rate for at least one second cleaning device 41, 42, 43 is additionally determined in process step V2.

In a process step V3, the output connections 32_1, 32_2, 32_3 of the fluid distribution device 30 are set in their open position or in their closed position according to the cleaning request.

In a method step V4, a power level of the fluid conveying device 10 is determined. The power level of the fluid conveying device 10 can, for example, be a rotational speed of the fluid conveying device 10.

In a process step V5, the actual fluid pressure generated by the fluid conveying device 10 is determined.

In a process step V6, an actual total flow rate delivered by the fluid conveying device 10 is determined based on the determined actual fluid pressure and the determined power level.

In the method step V6 for determining an actual total flow rate delivered by the fluid conveying device 10, this can be carried out using power level information of the fluid conveying device 10. In the case of a fluid conveying device 10 designed, for example, as a brushless DC pump 10, a rotational speed of the pump 10 is a power level of the pump 10.

In more detail, the method step V6 of determining the actual total flow rate can be carried out using a characteristic diagram of the fluid conveying device 10, which indicates the actual total flow rate that can be achieved by the fluid conveying device 10 as a function of the fluid pressure for different power levels of the fluid conveying device 10. FIG. 4 shows a corresponding characteristic diagram. It can be seen that as the power level increases, greater fluid pressures can be achieved with a simultaneously greater flow rate from the fluid conveying device 10. It can also be seen that the actual total flow rate can be determined using the characteristic diagram shown in FIG. 3 if the power level of the fluid conveying device 10 and the pressure generated by the fluid conveying device 10 are known.

In a method step V7, a first actual flow rate is determined by the first cleaning device 41, 42, 43 based on the actual total flow rate and based on the cleaning request. The determination of the first actual flow rate by the first cleaning device 41, 42, 42 is dependent on the actual total flow rate provided by the fluid conveying device 10, which is divided between the cleaning devices 41, 42, 43 that are assigned to an output connection 32_1, 32_2, 32_3 of the fluid distribution device 30 that is in the open position. Therefore, it is possible to determine the first actual flow rate through the first cleaning device 41, 42, 43 based on the actual total flow rate.

If an additional target flow rate is determined in process step V2 by at least one second cleaning device 41, 42, 42, then in process step V7 of determining the first actual flow rate by the first cleaning device 41, 42, 43, at least one further flow rate can additionally be determined by at least one further cleaning device 41, 42, 43 based on the actual total flow rate.

In method step V7 of determining the first actual flow rate by the first cleaning device 41, 42, 43 and, if necessary, further flow rates by the further cleaning devices 41, 42, 43, their determination is also based on switching positions of the output connections 32_1, 32_2, 32_3 of the fluid distribution device 30.

This is because the cleaning fluid delivered by the fluid conveying device 10 is divided between the line sections in which the output connections 32_1, 32_2, 32_3 of the fluid distribution device 30 assigned to these line sections are located in their respective open positions. The actual total flow rate is divided according to the flow resistances of the line sections located downstream of the output connections 32_1, 32_2, 32_3.

In an optional method step V8, a first pressure loss is determined in a line section 54, 30, 51, 52, 53, 41, 42, 43, via which the first cleaning device 41, 42, 43 is fluid-connected to the fluid conveying device 10, taking into account the first actual flow rate.

If an additional target flow rate is determined in process step V2 by at least one second cleaning device 41, 42, 42, then in process step V8 at least a second pressure loss in a line section 54, 30, 51, 52, 53, 41, 42, 43, via which the further cleaning device 41, 42, 43 is fluid-connected to the fluid conveying device 10, can also be determined, taking into account the first actual flow rate.

The determination of a pressure loss is dependent on the flow rate through the corresponding cleaning device 41, 42, 43. The fluid line via which the corresponding cleaning device 41, 42, 43 is fluid-connected to the fluid conveying device 10, in more detail to the fluid output connection 12 of the fluid conveying device 10, has, for example, a collecting fluid line 54 from the fluid output connection 12 to the fluid distribution device 30, the fluid distribution device 30, a fluid line via which an output port 32_1, 32_2, 32_3 of the fluid distribution device 30 is fluid-connected to the corresponding cleaning device 41, 42, 43, and the corresponding fluid distribution device 41, 42, 43.

The process step V8 of determining the first pressure loss or the multiple pressure losses also takes into account the actual total flow rate delivered by the fluid conveying device 10.

This is because the cleaning fluid delivered by the fluid conveying device 10 is divided into the line sections in which the output connections 32_1, 32_2, 32_3 of the fluid distribution device 30 assigned to these line sections are located in their respective open positions. Before the cleaning fluid is distributed to the respective line sections, the cleaning fluid passes through the collecting line 54 located between the fluid conveying device 10 and the fluid distribution device 30, which also contributes to the first pressure loss. Consequently, the total flow delivered by the fluid conveying device 10 passes through this collecting line 54.

In a method step V9, a flow rate control value is determined based on the first target flow rate and the first actual flow rate. In method step V9 for determining or calculating the flow rate control value, the flow rate value is determined in order to change the actual total flow rate generated by the fluid conveying device 10 so that cleaning fluid with the first target flow rate can be output from the first cleaning device 41, 42, 43. The flow rate control value is calculated, for example, from the difference between the first target flow rate and the first actual flow rate.

In a method step V10, the fluid conveying device 10 is adjusted in such a way that a fluid flow rate provided by the fluid conveying device 10 is changed by the flow rate control value so that the first actual flow rate approaches the first target flow rate.

Process steps V1 to V3 are preferably only carried out once per cleaning request, whereas process steps V4 to V10 are preferably carried out as often as necessary until the flow rate control value has approached a predetermined value.

As already indicated above, FIG. 5 shows the flow diagram of a process according to a further embodiment for controlling the cleaning system shown in FIG. 1 or the cleaning system shown in FIG. 2.

In process step V1_1, a cleaning request is determined for at least two, preferably for all cleaning devices 41, 42, 43. The cleaning request contains information about which vehicle sensor S1, S2, S3 is to be cleaned. Consequently, the cleaning request contains information on which cleaning device 41, 42, 42 is to be activated. Furthermore, the cleaning request contains information about how high the fluid flow rate at the outlets of the cleaning devices 41, 42, 43 should be. Furthermore, the cleaning request can contain information on the duration for which the cleaning devices should dispense cleaning fluid In process step V2_1, the respective target flow rates are determined for each cleaning device 41, 42, 43.

In process step V3, the output connections 32_1, 32_2, 32_3 of the fluid distribution device 30 are set in their open position or in their closed position according to the cleaning requirement In a method step V4, a power level of the fluid conveying device 20 is determined. The power level of the fluid conveying device can, for example, be a rotational speed of the fluid conveying device 20.

In a process step V5, the actual fluid pressure generated by the fluid conveying device 10 is determined.

In process step V6, an actual total flow rate delivered by the fluid conveying device 10 is determined based on the determined actual fluid pressure and the determined power level.

In the method step V6 for determining an actual total flow rate delivered by the fluid conveying device 10, this can be carried out using power level information of the fluid conveying device 10. In the case of a fluid conveying device 10 designed, for example, as a brushless DC pump 10, a rotational speed of the pump 10 is a power level of the pump 10.

In more detail, the method step V6 of determining the actual total flow rate can be carried out using a characteristic diagram of the fluid conveying device 10, which indicates the actual total flow rate that can be achieved by the fluid conveying device 10 as a function of the fluid pressure for different power levels of the fluid conveying device 10. FIG. 4 shows a corresponding characteristic diagram. It can be seen that as the power level increases, greater fluid pressures can be achieved with a simultaneously greater flow rate from the fluid conveying device 10. It can also be seen that the actual total flow rate can be determined by means of the characteristic diagram shown in FIG. 4 if the power level of the fluid conveying device 10 and the pressure generated by the fluid conveying device 10 are known.

In process step V7_1, a target total flow rate is determined by the cleaning devices 41, 42, 43 based on the cleaning request.

In the optional process step V8, a first pressure loss is determined in a line section 54, 30, 51, 52, 53, 41, 42, 43, via which the first cleaning device 41, 42, 43 is fluid-connected to the fluid conveying device 10, taking into account the first actual flow rate. This process step is carried out either by the control device 60 or by the fluid conveying device 10.

If an additional target flow rate is determined in process step V2 by at least one second cleaning device 41, 42, 42, then in process step V8 at least a second pressure loss in a line section 54, 30, 51, 52, 53, 41, 42, 43, via which the further cleaning device 41, 42, 43 is fluid-connected to the fluid conveying device 10, can also be determined, taking into account the first actual flow rate.

The process step V8 of determining the first pressure loss or the multiple pressure losses also takes into account the actual total flow rate delivered by the fluid conveying device 10.

This is because the cleaning fluid delivered by the fluid conveying device 10 is divided into the line sections in which the output connections 32_1, 32_2, 32_3 of the fluid distribution device 30 assigned to these line sections are located in their respective open positions. Before the cleaning fluid is distributed to the respective line sections, the cleaning fluid passes through the collecting line 54 located between the fluid conveying device 10 and the fluid distribution device 30, which also contributes to the first pressure loss. Consequently, the total flow delivered by the fluid conveying device 10 passes through this collecting line 54.

In process step V9_1, a flow rate control value is determined based on the target total flow rate and the actual total flow rate. In, process step V9_1 for determining or calculating the flow rate control value, the flow rate value is determined in order to change the actual total flow rate generated by the fluid conveying device 10 so that cleaning fluid with the target total flow rate can be output from the cleaning devices 41, 42, 43.

The flow rate control value is calculated, for example, from the difference between the target total flow rate and the actual total flow rate.

In process step V10_1, the fluid conveying device 10 is adjusted in such a way that an actual total flow rate provided by the fluid conveying device 10 is changed by the flow rate control value so that the actual total flow rate approaches the target total flow rate.

Process steps V1 to V3 are only carried out once per cleaning request, whereas process steps V4 to V10_1 are carried out until the flow rate control value has approached a predetermined value.

LIST OF REFERENCE SYMBOLS

1 Cleaning system
10 Fluid conveying device/pump
11 Fluid input connection (of the fluid conveying device)
12 Fluid output connection (of the fluid conveying device) Pressure sensor
20 Fluid distribution device/valve block
31 Input connection (of the fluid distribution device)
32_1 (first) output connection (of the fluid distribution device)
32_2 (second) output connection (of the fluid distribution device)

32_3 (third) output connection (of the fluid distribution device)
41 (first) Cleaning device/cleaning nozzle
42 (second) Cleaning device/cleaning nozzle
43 (third) Cleaning device/cleaning nozzle
51 (first) Fluid line
52 (second) Fluid line
53 (third) Fluid line
54 Collecting fluid line
60 Control unit
61 Data line/signal line
62 Data line/signal line
S1 (first) motor vehicle component/(first) sensor/motor vehicle sensor/optical sensor
S2 (second) vehicle component/(second) sensor/vehicle sensor/optical sensor
S3 (third) vehicle component/(third) sensor/vehicle sensor/optical sensor
V1 Process step
V1_1 Process step
V2 Process step
V2_1 Process step
V3 Process step
V4 Process step
V5 Process step
V6 Process step
V7 Process step
V7_1 Process step
V8 Process step
V9 Process step
V9_1 Process step
V10 Process step
V10_1 Process step

The invention claimed is:

1. A method of controlling a cleaning system for motor vehicle components, the cleaning system comprising:
a fluid conveying device;
a pressure sensor for determining a pressure generated by the fluid conveying device;
a fluid distribution device with at least one input connection fluid-connected to the fluid conveying device and with at least two output connections fluid-connected to the input connection, each output connection being adjustable between an open position and a closed position;
at least two cleaning devices, each fluid-connected via a fluid line to a respective output connection; and
a control device which is data-coupled to the fluid conveying device and the fluid distribution device for transmitting and/or receiving signals;
the method comprising:
determining a cleaning request for at least two cleaning devices;
determining a first target flow rate for at least one first cleaning device;
setting the output connections of the fluid distribution device in their open position or in their closed position according to the cleaning request;
determining a power level of the fluid conveying device;
determining an actual fluid pressure generated by the fluid conveying device;
determining an actual total flow rate delivered by the fluid conveying device based on the determined actual fluid pressure and the determined power level;
determining a first actual flow rate by the output connection to which the at least one first cleaning device is connected, or by the at least one first cleaning device based on the actual total flow rate and based on the cleaning request;
determining a flow rate control value based on the first target flow rate and the first actual flow rate; and
adjusting the fluid conveying device in such a way that the actual total flow rate provided by the fluid conveying device is changed by the flow rate control value so that the first actual flow rate approaches the first target flow rate,
wherein the method step of determining the first actual flow rate is carried out based on at least one second conversion table, wherein in a second conversion table the percentage flow rates are determined by a plurality of line paths assigned to the respective cleaning devices for all permutations of switching positions of all output connections of the fluid distribution device for an actual total flow rate provided by the fluid conveying device.

2. The method according to claim 1, wherein the method step of determining the first actual flow rate by the output connection to which the at least one first cleaning device is connected, or by the at least one first cleaning device based on the actual total flow rate and based on the cleaning request is also carried out based on switching positions of the output connections of the fluid distribution device.

3. The method according to claim 1, wherein the method step of determining the first actual flow rate is also based on a first conversion table which indicates the ratios of the flow rates through a plurality of line paths associated with the respective cleaning devices as a function of actual total flow rates provided by the fluid conveying device.

4. The method according to claim 1, wherein the method further comprises at the method step of determining the first target flow rate for at least one first cleaning device:
determining at least one further target flow rate for at least one second cleaning device and calculating a value on the basis of these determined target flow rates to adopt as the target flow rate.

5. A method of controlling a cleaning system for motor vehicle components, the cleaning system comprising:
a fluid conveying device;
a pressure sensor for determining a pressure generated by the fluid conveying device;
a fluid distribution device with at least one input connection fluid-connected to the fluid conveying device and with at least two output connections fluid-connected to the input connection, each output connection being adjustable between an open position and a closed position;
at least two cleaning devices, each fluid-connected via a fluid line to a respective output connection; and
a control device which is data-coupled to the fluid conveying device and the fluid distribution device for transmitting and/or receiving signals;
the method comprising:
determining a cleaning request for at least two cleaning devices;
determining respective target flow rates for each cleaning device;
setting the output connections of the fluid distribution device in their open position or in their closed position according to the cleaning request;
determining a power level of the fluid conveying device;
determining an actual fluid pressure generated by the fluid conveying device;

determining an actual total flow rate delivered by the fluid conveying device based on the determined actual fluid pressure and the determined power level;

determining a target total flow rate through the cleaning devices based on the cleaning request;

determining a flow rate control value based on the target total flow rate and the actual total flow rate; and adjusting the fluid conveying device in such a way that the actual total flow rate provided by the fluid conveying device is changed by the flow rate control value so that the actual total flow rate approaches the target total flow rate, wherein the method step of determining the actual total flow rate delivered by the fluid conveying device is carried out using a characteristic diagram of the fluid conveying device which indicates the actual total flow rate that can be achieved by the fluid conveying device as a function of the fluid pressure for different power levels of the fluid conveying device.

6. A cleaning system for motor vehicle components, comprising:

a fluid conveying device;

a pressure sensor for determining a pressure generated by the fluid conveying device;

a fluid distribution device with at least one input connection fluid-connected to the fluid conveying device and with at least two output connections fluid-connected to the input connection, each output connection being adjustable between an open position and a closed position;

at least two cleaning devices, each fluid-connected via a fluid line to a respective output connection; and a control device which is data-coupled to the fluid conveying device and the fluid distribution device for transmitting and/or receiving signals, wherein the control device is configured to carry out a method according to claim 1.

7. A motor vehicle with at least two motor vehicle components and with the cleaning system for cleaning the motor vehicle components according to claim 6.

* * * * *